United States Patent [19]
Ishida et al.

[11] 3,944,886
[45] Mar. 16, 1976

[54] PROTECTION APPARATUS FOR A CAPACITOR CONNECTED IN SERIES WITH AN ELECTRIC POWER CIRCUIT

[75] Inventors: Yotsuo Ishida, Ebina; Takeo Okazaki, Kawasaki; Hajime Matsumura, Yokohama; Shinichi Menju, Atsugi; Iwao Ohshima, Yokohama, all of Japan

[73] Assignees: Tokyo Electric Power Company, Ltd.; Tokyo Shibaura Electric Company, Ltd., both of Tokyo, Japan

[22] Filed: Jan. 24, 1975

[21] Appl. No.: 543,801

[52] U.S. Cl. ............. 317/12 A; 317/16; 200/148 G; 317/11 D
[51] Int. Cl.² ......................................... H02H 7/16
[58] Field of Search ........ 317/12 A, 12 B, 12 R, 16, 317/22, 59; 200/148 B, 148 G, 148 J

[56] References Cited
UNITED STATES PATENTS

| | | |
|---|---|---|
| 2,323,702 | 7/1943 | Berkey ........................ 317/12 A X |
| 2,351,988 | 6/1944 | Marbury et al. .................. 317/12 A |
| 3,385,941 | 5/1968 | Marbury ........................ 317/12 R X |
| 3,751,716 | 8/1973 | Johnson et al. .................... 317/12 A |

*Primary Examiner*—J. D. Miller
*Assistant Examiner*—Patrick R. Salce
*Attorney, Agent, or Firm*—Oblon, Fisher, Spivak, McClelland & Maier

[57] ABSTRACT

A protecting apparatus for a series capacitor in an AC power circuit includes an enclosure filled with a low pressure insulating gas. A discharge gap device, a bypass switch for the series capacitor and an electromagnetic repulsion device for closing the bypass switch in response to the discharge of the series capacitor are assembled in the enclosure in alignment with each other. A metallic cylinder is provided around the assembly forming a return path for the capacitor discharge current to cooperate with the gap device and its support. In this way, the impedance of the capacitor discharge passage can be effectively reduced to permit rapid removal of excess terminal voltage from the series capacitor.

8 Claims, 5 Drawing Figures

PROTECTION APPARATUS FOR A CAPACITOR CONNECTED IN SERIES WITH AN ELECTRIC POWER CIRCUIT

BACKGROUND OF THE INVENTION

1. Field of the Invention:

This invention relates to a protecting device for a capacitor connected in series with an electric power circuit to improve the power factor thereof.

2. Description of the Prior Art:

It is well known in the art to connect a capacitor in series with an electric power circuit such as, for example, power transmission lines, power distribution lines or bus bars for improvement of the power factor thereof to elevate the power transmission or power distribution efficiency.

When a fault such as a short circuit or a simultaneous multi-phase grounding or the like has occurred in an electric power circuit to cause an abnormally heavy current to flow through the capacitor, the terminal voltage across the capcitor may rise to such an extent as to destroy the capacitor. In order to eliminate this defect, an electric gap discharging device has been connected across the series capacitor to enable it to discharge excess voltage beyond the rated voltage of the capacitor to protect the capacitor from excess terminal voltage.

Since the discharge gap device suffers from the damage and wear of the electrode surfaces thereof caused by excess heating due to the flow of discharge current therethrough, a short circuit switch may be closed in response to the gap discharge cuurrent should be connected across the capacitor terminals. The short circuit switch may be returned to its original open position after a suitable time interval or after the termination of the fault in the power transmission line.

Consequently, the shorter the closing time of the circuit or bypass switch, the lighter the duty of the protecting gap device. That is to say, the capacitor bypass switch has a shorter closing time than that of a conventional circuit breaker. The capacitor bypass switch differs also from the conventional circuit breaker in that gas flow should be limited in case a relatively long period is necessary for bypassing the capacitor.

SUMMARY OF THE INVENTION

An object of the invention is to provide a protecting device for a capacitor connected in series with an electric power circuit which satisfies the above described requirements.

It is another object of the invention to provide a capacitor protecting device, the functional parts of which are enclosed in an enclosure which is filled with a pressurized insulating gas to enable the size of the capacitor protecting device to be reduced.

A further object of the invention is to provide a capacitor protecting device having a short circuit switch to quickly short circuit the capacitor for reducing the excess heat on the electrode surfaces of the gap device due to an electric arc between the electrodes.

It is a still further object of the invention to provide a capacitor protecting device which is able to bypass the capacitor discharge current through a relatively low impedance thereby reducing the time interval during which an excess voltage is applied to the capacitor terminals.

It is another object of the invention to provide a series capacitor protection device in which the air gap between the electrodes of the discharge gap device is gas blasted in response to the movement of a gap bypass switch to maintain the discharge gap clean to enable the gap to maintain stabilized discharge characteristics.

It is also an object of the invention to provide a series capacitor protection device having a discharge gap device for short circuiting the capacitor and a bypassing switch and its operating mechanism in alignment in an enclosure filled with an insulating gas to render the capacitor protection device of simple and small construction.

The foregoing and other objects are attained in accordance with one aspect of the present invention through the provision of apparatus including a capacitor connected in series with an electric power circuit for improvement of the power factor thereof. A protecting gap device is connected in parallel with the capacitor to bypass the capacitor current in response to a raised level of the terminal voltage across the capacitor when an excess current flows through the capacitor. A bypass switch is also provided for short circuiting the gap device and the capacitor by closing its contacts in response to the discharge current flowing through the gap device. The bypass switch is provided with a pair of contacts aligned with each other to effect on-off operation. A fluid operational cylinder is combined with one of the contacts of the bypassing switch to drive it towards the other contact and vice versa. An electromagnetic repulsion means is combined with either one of the contacts for generating an electromagnetic repulsion force in response to the capacitor discharge current flowing through the protecting gap device to move one contact towards the other contact to make them independent of the driving cylinder. The discharge gap device, the electromagnetic repulsion device, the pair of contacts and the driving cylinder are aligned with each other along an axis so that the discharge gap device assumes an uppermost position. A concentrically cylindrical member constructed of an electrically conductive material and mounted around the aligned parts has a closed end positioned at the side of the discharge gap device and an open end positioned at the side of the driving cylinder for the bypass switch. The cylindrical member is connected in parallel with the aligned parts to provide a current path which includes the gap device and a magnetic repulsion winding of the electromagnetic repulsion device for discharging the capacitor current until the contacts of the capacitor bypass switch are closed.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DETAILED DESCRIPTION OF THE PREFERRED EMBODIMENTS

Figure 1:
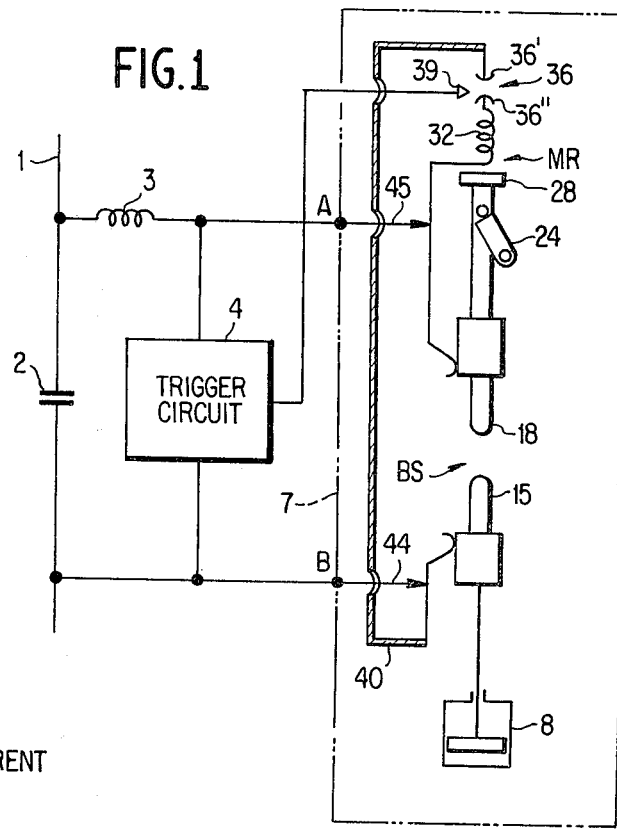
FIG. 1 is a diagrammatic view of one embodiment of a protecting apparatus for a series capacitor in accordance with the invention.

Referring now to the drawings, wherein like reference numerals designate identical or corresponding parts throughout the several views, and more particularly, to FIG. 1 thereof, reference numeral 1 designates the aforesaid main electric power circuit, 2 is the aforesaid capacitor connected in series in the main circuit, and 7 is a main body or enclosure which encloses a short circuit switch BS with a protecting gap device 36.

The capacitor protecting device with the bypass switch BS and a protection gap device 36 is connected across the terminals of capacitor 2 as shown through connection parts A and B. 3 is a braking reactor provided in series with the connection circuit. A trigger pulse generating circuit 4 is connected across the capacitor 2 in a circuit between braking reactor 3 and connection parts A and B and generates a high potential triggering pulse in response to a predetermined excess terminal voltage of capacitor 2 so that the triggering pulse is applied to trigger electrode 39 of a protecting gap device 36 mounted in the enclosure 7.

In the enclosure 7, in addition to the protecting gap device 36, there is provided a rodlike bypass contact 18 and a breaking contact or interruption contact 15 for formation of a bypass switch BS. The bypass contact 18 is slidably connected to the connection part A. The breaking contact 15 is also slidably connected to the connection part B. In this way, both contacts 15 and 18 are connected across the terminals of capacitor 2.

The bypass contact 18 is a stationary contact of the switch BS. It is, however, able to move only when capacitor 2 is short circuited. That is, the contact 18 is normally held at a position as shown by means of a catch member 24. An electromagnetic repulsion device MR is provided upwards of contact 18 and comprises a disc like repulsion member 28 fixed onto an upper end of the contact 18 and a primary repulsion coil 32 provided above the disc member 28. One end of the primary repulsion coil 32 is connected to a sliding part between connection part A and contact 18 while the other end is connected to a lower main electrode 36" of the protecting gap device 36. An upper main electrode 36' of the gap device 36 is connected to connection part B through a bypass cylinder 40 made of a condutive material and is connected to a sliding part of contact 15. For convenience of illustration, there is only shown the left hand half of the cylinder member 40 in FIG. 1. It can thus be understood that the series combination of the primary repulsion coil 32 and the main electrodes 36' and 36" of the gap device 36 is connected across the terminals of capacitor 2. The breaking contact 15 is also provided with a driving cylinder 8 downwards thereof which forces the contact 15 to move from its short circuit position upwards to return the bypass contact 18 to its original position and then to force the contact 15 to separate from the bypass contact 18 downwards to return to its original position to remove the short circuit from capacitor 2. The above operation will be described in detail hereinafter.

FIG. 1 shows that the protecting gap device 36, the electromagnetic repulsion device MR, the pairs of contacts 18 and 15 and the driving cylinder 8 are arranged on the same axis. In a conventional installation, the protecting gap device 36 is separated from the position as shown and mounted at a forward or backward position of the connection part B. However, with this arrangement, it will be clearly understood from FIG. 2 that the casing becomes larger in size as well as more expensive. However, in accordance with the invention, the protecting gap device 36 is aligned with the other parts which is physically equivalent to positioning the protection gap device 36 adjacent to the connection part B because of the improved manner of connection by the bypass cylinder 40. As a result, the aforesaid defect can be remedied.

As soon as the terminal voltage across capacitor 2 increases excessively due to an excess current flow caused by a short circuit or an increase of load current in the main circuit 1, the trigger circuit 4 responds immediately to the excess terminal voltage of capacitor 2 and applies a high voltage triggering pulse to the trigger electrode 39. Any conventional circuit arrangement may be used for the trigger circuit 4. For example, the arrangement may include a trigger gap device comprising an evacuated weatherproof envelope and three electrodes enclosed in the envelope. The first and second electrodes are positioned against each other through a gap therebetween and are connected between an auxiliary DC voltage supply including a normally charged capacitor and a pulse transformer having a high voltage secondary winding to apply a high voltage triggering pulse to the trigger electrode 39 upon a discharge between the first and second electrodes. The third electrode is positioned in a discharge gap between the first and second electrodes. A moderately divided voltage of the series capacitor 2 is applied to the third electrode and either one of the first and second electrodes. In this way, the trigger gap device 4 can discharge the electric charges accumulated in the auxiliary capacitor through the first and second electrodes in response to a predetermined excess voltage which may occur across the series capacitor 2 and thereby initiate an electric arc between the triggering electrode 39 and the electrode 36' of the protecting gap device 36. Consequently, as soon as a triggering pulse is applied to the gap device 36, an electric discharge occurs between main electrodes 36' and 36" to bypass the current flowing through capacitor 2 so that the excessive terminal voltage across the capacitor 2 is removed therefrom.

Figure 3:
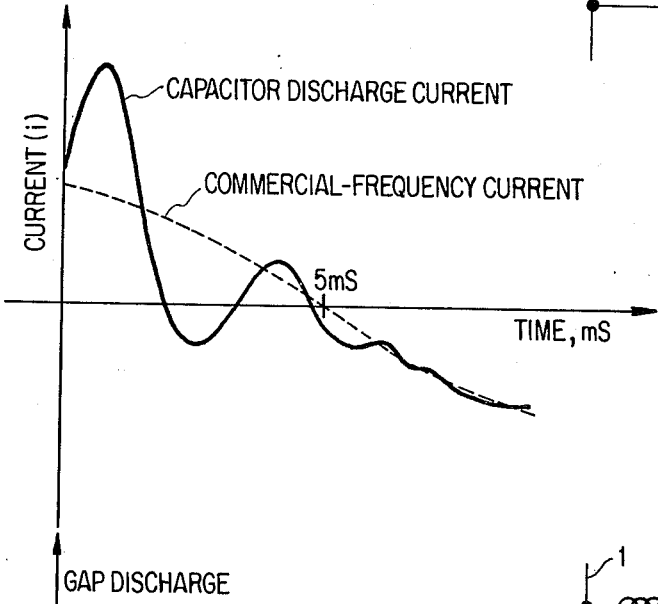
FIG. 3 is a curved diagram for illustration of the function of the protecting apparatus of FIG. 2.

It can easily be understood that the bypassing of the capacitor means the discharge of the capacitor 2. The discharge energy from the capacitor 2 is considerably large and the discharge current flows through the primary coil 32 of electromagnetic repulsion device MR, the protecting gap device 36 and the current bypass cylinder or metallic shroud 40. FIG. 3 shows the capacitor discharge current which changes every moment after the discharge of the protecting gap. The rate of change of discharge current or the rate of decrease depends on the inductance of the braking reactor 3 and the inductance of the above current conduction circuit which are selected so that magnetic repulsion disc 28 is sufficiently magnetically repelled by the electromagnetic repulsion coil or the primary coil 32 so as to be able to release the contact 18 from its catch member 24.

In accordance with this embodiment, as the capacitor discharge current path, which serially includes the primary winding 32 of electromagnetic repulsion device MR, the main electrodes 36' and 36'' of the protecting gap device 36 and the metallic shroud 40, is bent to form a current return path with less inductance, the electric charges on capacitor 2 are able to discharge rapidly through the path to create a high magnetic repulsion force caused by the high discharge current from the capacitor 2.

The circular shaped magnetic repulsion disc 28 is provided with a secondary coil (not shown) buried therein to generate an induction current induced by the primary winding 32 therethrough to generate an electromagnetic repulsion force between the winding 32 and the coil. The bypass contact 18 is therefore pushed down with an intensive repulsion force. In this way, catch member 24 releases the rod contact 18 and the rod contact 18 moves downwards to contact the breaking contact 15 so that the short circuit across capacitor 2 bypasses the current from the capacitor 2 in place of the protection gap device 36.

As described in detail hereinbelow, an electric arc generated in the gap device 36 can, of course, be extinguished by gas blasting.

After elimination of the fault or excess current, in order to return the capacitor 2 to the normal state of connection, the breaking contact 15 is pushed up by means of the driving cylinder 8 to push the bypass contact 18 up to reengage the contact 18 with the catch member 24. The contact 18 is thus reset at its original position. During that time the electric current does not flow through the main circuit 1, or the current is reduced below its normal amplitude, so that the electromagnetic repulsion force generated by the electromagnetic repulsion device is of considerably small amplitude. Consequently, the reset movement of the bypass contact 18 is not hindered. After this, the driving cylinder 8 forces the breaking contact 15 to return to its original downward position. At this time, both contacts 15 and 18 should break the normal current. However, this can be done by blasting gas against an electric arc extended between both contacts as described in greater detail below.

The capacitor protecting apparatus as shown in FIG. 1 is illustrated in detail with reference to FIG. 2 in which the same or identical parts as those of FIG. 1 are designated by the same reference numerals.

Construction of Tank or Enclosure 7 is a tank made of metal which is grounded electrically and filled with a low pressure insulating gas such as $SF_6$. Tank 7 supports all internal parts therein and includes a base member 5 as a bottom of the low pressure tank 7, a lower end cover 6, connection parts A and B as shown in FIG. 1, insulating spacer members 10 and 11 each supporting connection rods 44 and 45, an insulating spacer member 13 which supports a connection rod of the trigger electrode 39 of FIG. 1, and a cover member 14 which seals an upper opening of the tank.

Driving Part

A high pressure gas tank 9 is mounted on the base member 5 and is positioned in the low pressure gas tank or enclosure 7. A high pressure gas charging inlet 16 extends out from base member 5. A driving cylinder or piston and cylinder assembly 8 is mounted on a lower surface of the high pressure gas tank 9 and a closing control valve 19 and a breaking control valve 20 thereof are controlled automatically and manually by electric command signals from a control board (not shown) enabling the upward and downward movement of the breaking or opening contact 15 to utilize the driving piston 21 for carrying out the closing and opening operations. A damping piston and cylinder assembly 22 is mounted on a center position of the high pressure gas tank 9 and a piston rod 23 of the driving piston 21 is connected with an insulating rod 26 which, in turn, extends upwards to couple with a breaking contact 15. A supporting tube 27 made of an insulating material is mounted on the upper surface of high pressure gas tank 9 surrounding the insulating rod 26. A flange member 55 made of metal and having a gas exhausting outlet 29 and a slidable connection part 64 for the rod 44 is provided on supporting tube 27.

High Potential Part

The breaking and bypass contacts 15 and 18 are positioned against each other within an insulating tube 30 which is mounted on the flange 55. An intermediate flange 33 is provided on the upper end of insulating tube 30 for mounting an auxiliary stationary and cylindrical contact 31 thereon surrounding the bypass contact 18. A cylindrical valve member 34 is provided in the flange member 33 so as to be slidably guided by a shelf member 65 which crosses within the flange member 33.

A cylindrical casing 41 made of metal is mounted on the upper end of the flange member 33 and has a bottom with a valve seat on which the cylindrical valve 34 is seated. A rod member 35 extends in the casing 41 coaxially with the bypass contact 18. The upper end of rod 35 is normally secured by the catch member 24 as described in greater detail hereinbelow. The cylindrical valve member 34 is supported around the rod member 35 and is normally biased towards the valve seat of the bottom of casing 41 by a coiled spring 66 interposed between the valve member 34 and the flange 67 of the rod 35.

The metallic casing 41 also has a shelf 63 positioned just below the catch member 24. A coiled spring 37 is provided between the shelf 63 and a movable flange 69 located at a predetermined level of the rod 35 so that the rod member 35 is normally biased downwards by the spring force of the coiled spring 37. A high pressure gas passage 42 is provided at the internal periphery of the metallic casing 41 for conduction of a pressurized gas therethrough when the cylindrical valve member 34 is moved down away from its valve seat as described below. The metallic casing 41 further includes a slidable connection part 70 at an outer periphery thereof to slidably receive the connection rod 45 therein.

The aforesaid electromagnetic repulsion device MR is mounted on the top of the metallic cylindrical casing 41 by supporting a casing or framework 48 thereof on an inner periphery of the top of casing 41. The primary repulsion winding assembly 32 is supported on the framework 48 by being interposed between the framework 48 and a coil supporter 49. An electromagnetic repulsion disc 28 which has buried therein a secondary coil is positioned just below the primary winding assembly 32 and has a rod member 43 which extends downwards from the disc 28 and has a lower head entering the upper claws of the catch member 24 so as not to thereby release the head portion of the rod member 35 from the catch member 24. A coiled spring 46 is positioned between the repulsion disc 28 and a bottom of the framework 48 to normally bias the disc member 28 upwards with the rod member 43 against the total weight of both members 28 and 43. The uppermost position of the repulsion disc 28 is limited by the lower end of a rod or stopper member 47 which extends downwards from the primary winding supporter 49.

An electric insulator or ring member 50 is also supported on the upper end of the metallic casing 41 surrounding the electromagnetic repulsion device MR and supports the protecting gap device 36 thereon. The gap device 36 includes a ring insulator 53 having upper and lower open ends closed by gas exhausting flange members 51 and 52. The gap device 36 also includes the main electrodes 36' and 36'' respectively mounted on the upper and lower gas exhausting flange members 51 and 52 so as to face each other with an air gap therebetween. The trigger electrode 39 is mounted on an inner side wall of ring insulator 53 and is directed towards the air gap between the main electrodes 36' and 36'' and is slidably connected to one end of rod member 19 supported by an insulating spacer member 13.

The lower gas exhausting flange member 52 of the gap assembly 36 has a recessed portion 71 for receiving a projection of the winding supporter 49 therein to form an electric connection between the primary repulsion winding 32 and the lower main electrode 36''.

An electrically insulating tubular member 56 is mounted on the cover member 14 so as to be hung therefrom. An end plate 57 having an electrical static shield ring 72 therearound is provided on a lower end of the tubular member 56. The end plate 57 has an opening 73 at its center position to receive and support a projection or member 54 which extends upwards from the upper gas exhausting flange 51.

The aforesaid gas passage 42 provided in the metallic casing 41 exends upwards through the insulating tube 50 and the lower flange 52 of the gap assembly 36 to the main gap assembly 36 so that, when the cylindrical valve 34 opens to connect the inside of flange 33 with the passage 42, an insulating gas is supplied within the main gap assembly 36 to blast the air gap between electrodes 36' and 36'' to clean the gap. It can clearly be seen that the blasted gas is exhausted through main electrodes 36' and 36'' and upper and lower flanges 51 and 52 into the low pressure atmosphere in the enclosure 7.

The bypass cylinder 40 has a bottom through which the rod 54 of the gap assembly 36 extends and which is located between the tubular insulator 56 and the gap assembly 36 and has a lower open end fixed to the gas exhausting flange 55. In this way, the bypass cylinder 40 serves as a bypass passage between the protecting gap assembly 36 and the breaking contact 15 when an arc discharge occurs between main electrodes 36' and 36'' due to an over voltage across the capacitor 2.

Assume in FIG. 1 that an excess current has passed through the capacitor 2 due to a short circuit in the main power circuit 1 to start the trigger circuit 4. A high voltage pulse is fed from the trigger circuit 4 to an air gap between the trigger electrode 39 and the main electrode 36' through a path including connection rod 44, flange 55, bypass cylinder 40 and upper main electrode 36'. As a result, a main air gap between main elecrodes 36' and 36'' is ionized to start the discharge of electric charges charged in capacitor 2. The charge discharging path is traced from the upper terminal of capacitor 2 to the lower terminal thereof through reactor 3, connection rod 45, metallic casing 41, primary repulsion winding 32 of electromagnetic repulsion device MR, lower main electrode 36'', upper main electrode 36', projection or rod 54, bypass cylinder 40, flange 55 and connection rod 44.

It is to be understood that the charge discharging path includes bent or parallel paths through which the capacitor discharging current can flow in reverse, and, one path serially includes the upper part of casing 41, primary repulsion winding 32, main electrodes 36' and 36'' and rod 54. Another path includes the upper part of bypass cylinder 40. The bent or parallel paths described above allow the circuit impedance thereof to be effectively reduced so that the charge discharge time of capacitor 2 can be reduced in order to rapidly remove the excess terminal voltage from the capacitor 2 to prevent the occurrence of a capacitor fault.

As soon as capacitor discharge current flows through the primary repulsion winding 32, an electromagnetic repulsion force occurs between the winding 32 and the secondary disc member 28 to rapidly repel the latter from the former so that the disc member 28 is rapidly moved down with the rod 43 thereof. Consequently, the head of the rod 35 is released from the lower claws of catch 24 so that the rod 35 is moved down by the force generated from the coiled spring 37 to close the bypass contact 18 with the breaking contact 15. In this way, the short circuit of the capacitor 2 can be achieved by the closed contacts 15 and 18 to bypass the electrodes 36' and 36'' of gap assembly 36 so that the elctric arc in the air gap between main electrodes 36' and 36'' can be extinguished.

When the rod 35 moves down, the cylindrical valve member 34 is moved away from its seat so that a pressurized gas being charged in the intermediate flange 33 through the cylindrical supporting members 27 and 30 flows into the gap assembly 36 through the gas passage 42 to blast the air gap between electrodes 36' and 36'' to clean it. Then, the blasted gas is exhausted from the gap assembly 36 through the main electrodes 36' and 36'' and exhausting flanges 51 and 52 into the low pressure atmosphere in the enclosure 7. During gas blasting in the gap assembly 36, the breaking contact 15 is on its seat provided on the flange 55 so that the pressurized gas does not exhaust into the enclosure 7 through the contact 15 and the exhausting port 29.

After elimination of fault in the main power circuit 2, the closing control valve 19 is opened so that a high pressure gas enters below the piston 21 to push the rod up with the contact 15. The contact 18 is accordingly pushed up with the rod 35 against the force of spring 37 so that the upper head of the rod 35 engages again with the catch member 24. At the same time, the repulsion disc 28 is reset at its original position because the current flowing through the winding 32 is reduced to a normal amplitude. Then the opening of the control valve 19 is altered by the control valve 20 so that a high pressure gas enters above the piston 21 to rapidly push the rod member 23 down to separate the contact 15 from the contact 18.

For the time interval in which the contact 15 moves down to seat on the exhausting flange 55, a pressurized gas flows into the tubular contact 15 and is exhausted from the flange port 29. As is clear from the above, during the opening stroke of the contact 15, a pressurized gas flow is directed to an elongated electric arc between the contacts 15 and 18 which are separated from each other so that the electric arc is extinguished by gas blasting in a manner similar to that of a conventional gas blasting electric circuit breaker. It is to be understood that as the current flowing through contacts 15 and 18 at this time reaches either a normal level or substantially zero, the current interruption is easily made. After the current interruption, the tubular contact or breaking contact 15 is seated on the flange 45 to terminate the exhausting gas flow to thereby reset all parts for the protection of the capacitor 2.

From the above, in accordance with the series capacitor protecting apparatus of the embodiment, the main gap assembly 36, the capacitor bypass and current interruption contacts 18 and 15, the electromagnetic repulsion device MR for rapidly moving the contact 18 down and the drives 21 and 17 for moving the current interruption contact 15 are aligned with each other in the low pressure gas enclosure 7 so that the size of the capacitor protecting apparatus can be effectively reduced. As is clear from FIG. 2, the presence of main gap assembly 36 along the same axis as the other parts helps to make the capacitor protecting apparatus compact.

It is further to be understood that the main parts, as described above, are disposed in the atmosphere of a high pressure gas with a high dielectric strength which is enclosed by the tubular insulators 27, 30, 50 and 53, the tubular connector 33 and the metallic casing 41. In addition, the above assembly is disposed in the atmosphere of a low pressure insulating gas in the enclosure 7 so that the size of the capacitor protecting apparatus can be made small. The capacitor bypass switch BS is able to form the bypass across the capacitor 2 by the electromagnetic repulsion device MR which positively utilizes an intensive discharge energy from the series capacitor 2 so that the time necessary for closing the bypass switch BS can be greatly reduced to thereby reduce the duty of the capacitor protecting gap assembly 36 with respect to the electric arc.

Figure 4:
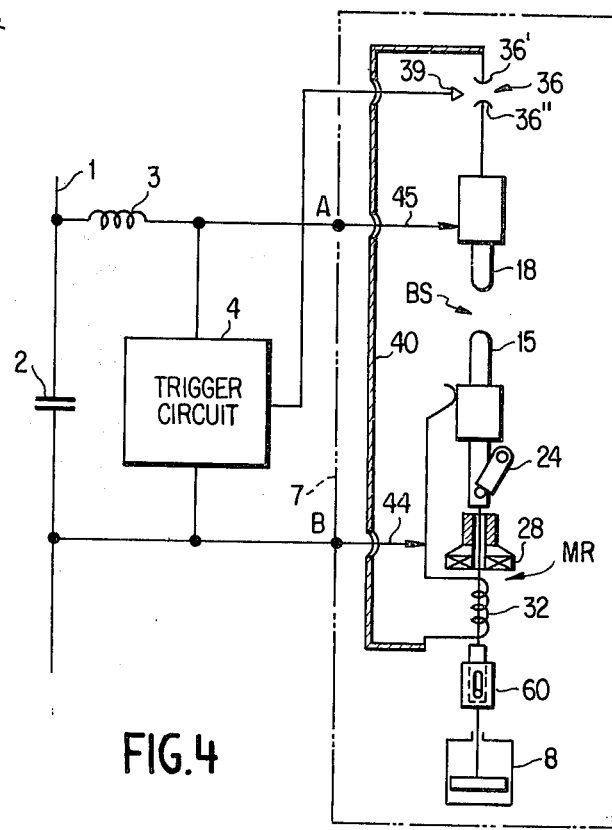
FIG. 4 is a simplified connection diagram of another embodiment of the invention.
Figure 2:
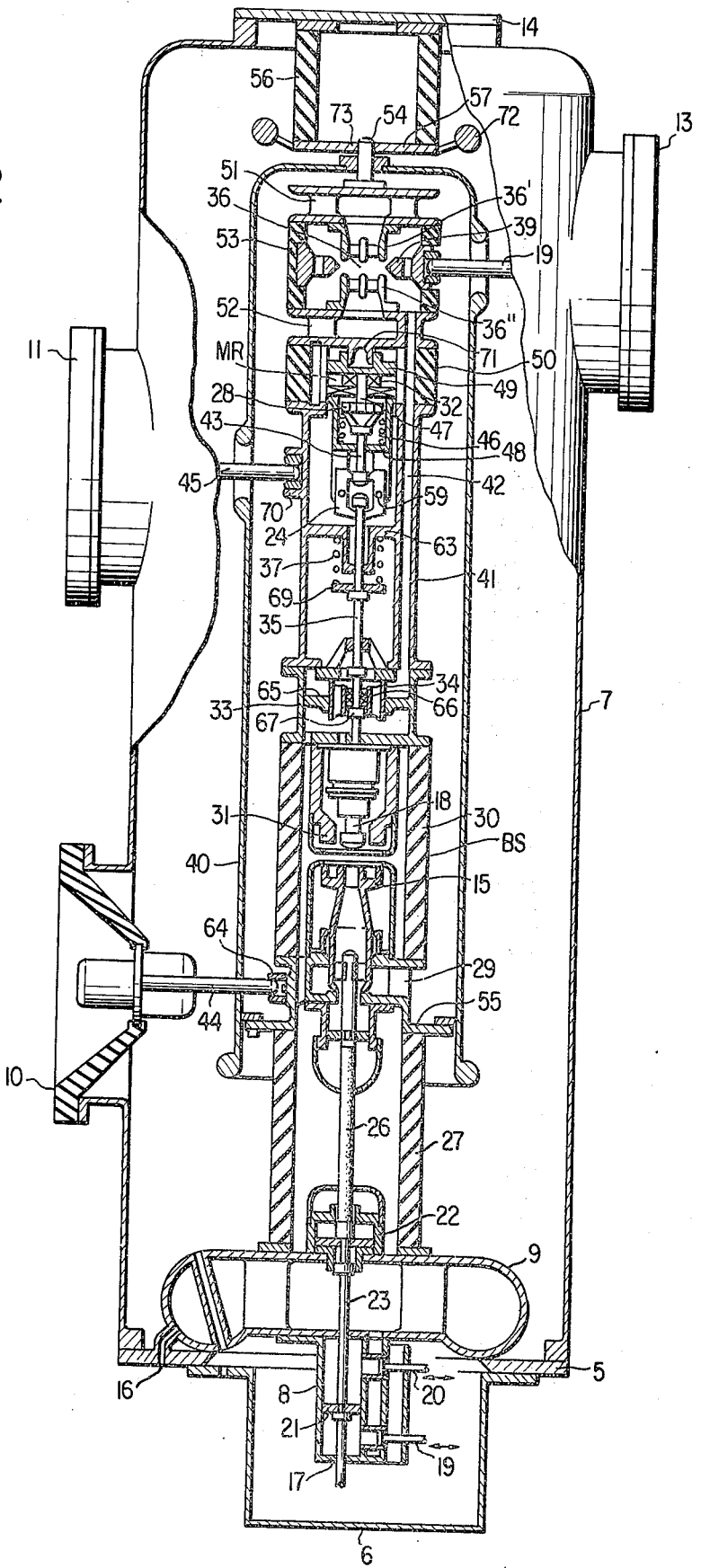
FIG. 2 is an elevational section, in detail, of the protecting apparatus shown in FIG. 1.

FIG. 4 shows another embodiment of the invention in which the same or identical parts are designated by the same reference numerals as those of FIGS. 1 and 2. In this embodiment, the contact 18 of the bypass switch BS is of a stationary type and is connected with the lower electrode 36'' of the capacitor protecting gap assembly 36. The lower contact 15 of the bypass switch BS is driven by means of the driving piston and cylinder assembly 8 to make and break with the stationary contact 18 and is combined with the catch member 24 and fixed to the repulsion disc member 28 of the electromagnetic repulsion device MR in a manner similar to that of FIG. 1. The primary winding 32 of the electromagnetic device MR is positioned below the repulsion disc 28 and is connected between the lower periphery of the concentric bypass cylinder 40 and the slidable connection part of the movable contact 15 as shown.

In this embodiment, when the capacitor protecting gap device 36 discharges, the discharge current from the capacitor 2 flows from the bypass cylinder 40 through the primary winding 32 of the magnetic repulsion device MR to the movable contact 15, with the result that the magnetic repulsion force causes the movable contact 15 to move upwards to contact the disc member 28 with the stationary contact 18.

The movement of the contact 15 is different from that of FIG. 1. A lost motion coupling device 60 is provided between the drive or piston and cylinder assembly 8 and an operational rod of of the movable contact 15 so that the upward movement of contact 15 caused by the electromagnetic repulsion is not distrubed by the presence of the drive or piston and cylinder assembly 8. The catch member 24 releases the movable contact 15 when the latter is pushed up by the electromagnetic repulsion force.

As described in greater detail hereinafter, the elevated movable contact 15 is held at its position to bypass the electrodes 36' and 36'' and cooperates with the stationary contact 18 in spite of the reduction of the current flowing through the primary winding 32 of the electromagnetic repulsion device MR. After extinguishing the electric arc between the electrodes 36' and 36'', the drive 8 forces the movable contact 15 to move down from the stationary contact 18 so that the series capacitor 2 opens its terminals to be again connected in series with the power circuit 1.

Figure 5:
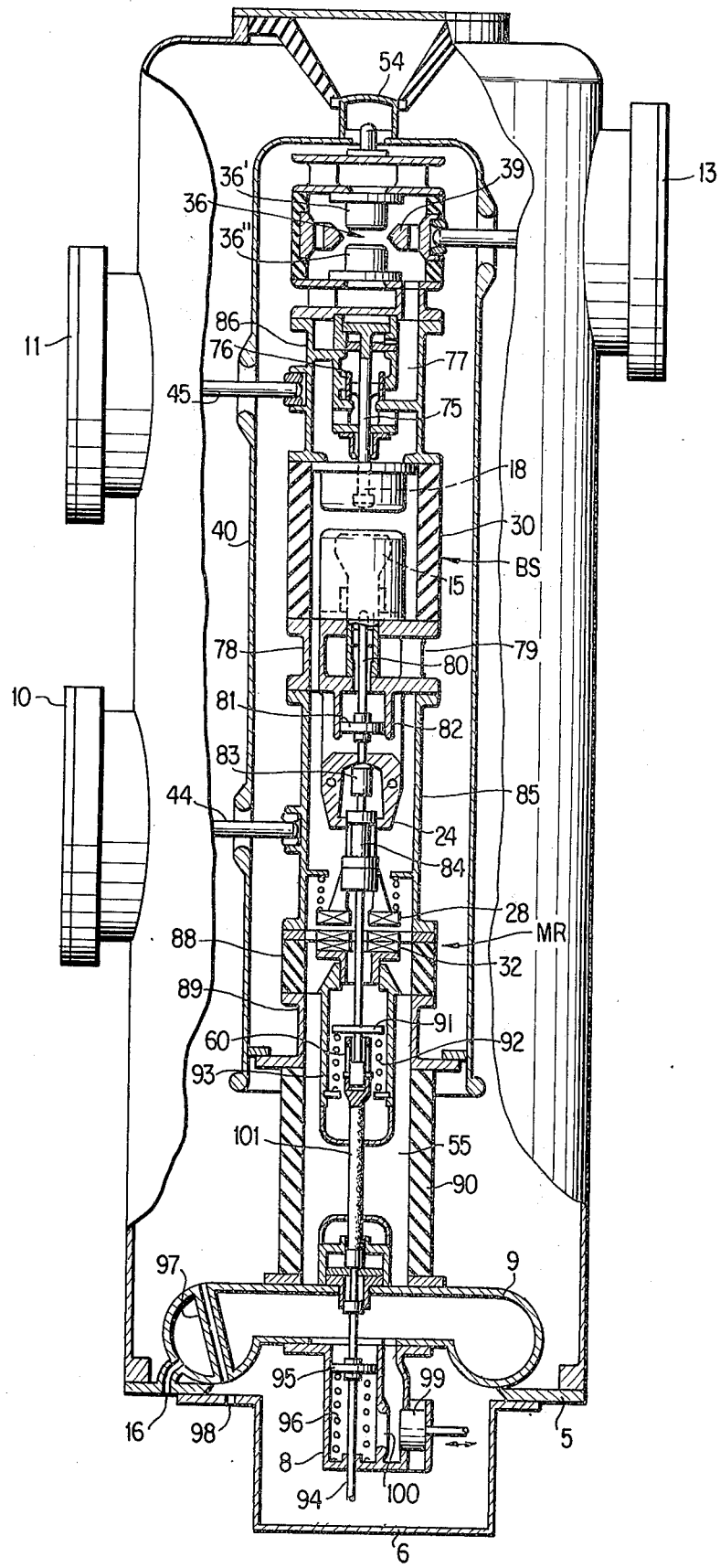
FIG. 5 is a detailed elevational section of the apparatus shown in FIG. 4.

FIG. 5 shows the capacitor protecting apparatus shown in FIG. 4 in detail in which parts similar to those of FIGS. 1 and 2 are designated by the same reference numerals. The contacts 15 and 18 are positioned in faced relation in a tubular insulator 30. A metallic casing 86 is mounted on the upper end of the tubular insulator 30 to mount the gap device 36 thereon and is slidably coupled with the connection rod 45 which is connected with the upper terminal of the capacitor 2 of FIG. 2. The stationary contact 30 has a rod 75 extending upwards and is provided with a cylindrical valve 76 which normally is seated on a valve seat in the casing 86 to close a gas passage 77 of the casing 86 through which an insulating gas flow is directed into a space of the gap assembly 39. The movable contact 15 is a tubular type and has its lower open end which normally is seated on a valve seat disposed on an intermediate flange member 78. The flange member 78 also has an outlet port 79 through which an insulating gas is exhausted when the lower end of the contact 15 is separated from the valve seat for current interruption.

The movable contact 15 is mounted at the upper end of an elongated rod member 80 which in turn has a piston 81 slidably mounted in a cylinder 82 which projects downwards from the flange member 78. The rod 80 also has a swelled portion 83 which is normally positioned below the upper claws of the catch member 24 which is in turn mounted on the flange member 78 as shown.

The electromagnetic repulsion device MR having a primary repulsion winding 32 and a repulsion disc member 28 similar to those of FIG. 2 is provided around the rod member 80. The disc member 28 is mounted on a tubular boss member 84 fixed around the rod 80 as shown. The tubular boss member 84 has an upper flange which normally enters between the lower claws of catch member 24 so as to normally catch the swelled portion 83 of the rod 80 as shown. The catch member 24 and the electromagnetic repulsion device 24 are located in a metallic casing 85 which is mounted below the flange member 78 and which is slidably connected to the connection rod 44 which is connected to the lower terminal of the capacitor 2 of FIG. 4.

A ring like insulator 88 is fixed between a lower end of metallic casing 85 and a tubular coupler 89 which is mounted on an upper end of a tubular insulator 90. The lower end of rod member 80 is extended downwards through the electromagnetic repulsion device MR and terminates at the lost motion coupler 60.

The lost motion coupler 60 is positioned in a tubular member 93. A flange member 91 is fixed to a part of the rod 80 above the coupler 60. A coiled spring 92 is arranged between the flange member 91 and the bottom of tubular member 93 to normally bias the rod member 80 upwards.

A high pressure gas tank 9 is mounted on a base 5 in a manner similar to that of FIG. 2. A high presssure insulating gas is fed into the tank 9 through an opening 16 provided through the base 5. The aforesaid insulating tube 90 is mounted on an upper surface of the tank 9 and the fluid operational cylinder 8 is mounted on a lower surface thereof. A piston rod 94 of the operational cylinder 8 extends through the high pressure gas tank 9 and is connected at its upper end to an insulating rod 101 which is in turn connected to the lost motion coupler 60.

The piston and cylinder assembly or fluid operational cylinder 8 has a piston 95 fixed to the piston rod 94. A coiled spring 96 is provided between the piston 95 and the bottom of the cylinder 8 to normally bias the piston rod 94 upwards. The inside of the enclosure 7 is filled with a low pressure insulating gas and is connected with a lower pressure gas atmosphere through a pipe 97 which extends through the high pressure tank 9 and an opening 98 provided in a base cover member 6.

The fluid operational cylinder 8 has a cylindrical valve 99 which is operated by a signal from a control board (not shown) to open and close an opening 100 capable of connecting the inside of cylinder 8 with the low pressure atmosphere within the base cover 6.

The cylindrical valve 99 is normally separated from its valve seat around the opening 100 so that equal gas pressure is present on the upper and lower surfaces of piston 95 to thereby elevate the rod member 94 by the upward biasing force of spring 96. The lost motion coupler 60 takes the position shown in FIG. 4 so as to be able to freely move the rod member 80 upwards.

When an excess current flows through the capacitor 2 of FIG. 4 to cause an excess terminal voltage an air gap between electrodes 36' and 36" of the gap assembly 36 is broken down to generate an electric arc therebetween as described above. The capacitor discharge current flowing through the gap device 36 flows from the connection rod 45, metallic casing 86, electrodes 36' and 36" of gap device 36, pin or rod 54 mounted on top of the gap device 36, metallic cylinder 40, metallic flange 89, primary winding 32 of the electromagnetic repulsion device MR and metallic casing 85 to the connection rod 44.

It can be seen from FIG. 5 that the capacitor current discharge path as described above presents two return passages capable of reducing the inductance thereof so as to permit the capacitor 2 to discharge rapidly.

The electromagnetic force which is generated between the primary winding 32 and the disc member 28 of the electromagnetic repulsion device MR repels the disc member 28 with the rod 80 so that the rod 80 is quickly elevated to disengage the upper flange of member 84 with the lower claws of catch 24. At this time, the swelled portion 83, of rod 80 enters between the upper claws of catch 24 so as to freely elevate the rod 80. The elevation of rod 80 allows the movable contact 15 to maker contact with the stationary contact 18. The elevational movement of the rod 80 is enhanced by the extension of coiled spring 60 and the gas exhaustion from the upper surface of piston 81 in the cylinder 82 through the valve seat of the flange member 78 which is opened by elevation of the movable contact 15.

The movable contact 15 further elevates the stationary contact 75 with the cylindrical valve 76 so that an insulating gas is directed into the gap device 36 through the valve seat opened by the valve 76 and the passage 77 to thereby blast the gas flow to the surfaces of electrodes 36' and 36". In this way, the electric arc extending between electrodes 36' and 36" is extinguished and the electrode surfaces are cleaned.

The movable contact 15 is maintained at its elevated level to make contact with the stationary contact 18 by a differential gas pressure which functions to elevate movable contact 15 due to the difference between the front and back surface areas of the contact 15, the gas pressure directed to the lower surface of piston 82 and the force on the piston 91 from the coiled spring 92 positioned between the flange 91 and the bottom of cylinder 93.

In this way, the capacitor current is completely bypassed by the bypass switch BS. After elimination of a fault current flowing through the series capacitor, the cylindrical valve 99 is pushed leftwards to open the inside of cylinder 8 to the low pressure atmosphere in the base cover 6 through opening 100 and valve 99. Consequently, the piston 95 is lowered due to high pressure on the upper surface thereof and causes the rod 101 to move downwards. As is clear from FIG. 4, after engagement of the two members of the lost motion coupler 60 with each other, the rod member 80 also moves down to separate the movable contact 15 from the stationary contact 18.

During the downward movement of the movable contact 15, a gas exhausting passage is formed through an upper opening of the contact 15, the inside thereof, the lower opening thereof and the port 79 of flange 78 so that the electric arc between contacts 15 and 18 is directed into the inside of the movable contact 15 to be elongated and to be extinguished.

The movable contact 15 is finally seated on its valve seat to close the outlet port 79 of the gas and the swelled portion 83 of rod member 80 is positioned below the upper claws of catch 24 to prevent the rod 80 from being elevated until the next operational signal is received.

Since it is understood that the series capacitor protecting apparatus of this embodiment provides an effectiveness similar to that shown in FIGS. 1 and 2, the description thereof is omitted.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A protecting apparatus for a capacitor connected in series with an electric power circuit for improvement of the power factor thereof comprising:
   a protecting gap assembly connected in parallel with the capacitor to bypass the capacitor current by discharging it in response to a predetermined excess voltage across the capacitor when an abnormall excess current flows through the capacitor,
   a bypass switch for short circuiting the gap assembly with the capacitor in response to the discharge current flowing through the gap assembly,
   the bypass switch being provided with a pair of contacts aligned with each other in faced relation to effect on-off operation, a fluid operational driving cylinder combined with one of the contacts of the bypass switch, an electromagnetic repulsion means combined with either one of the contacts for generating an electromagnetic repulsion force in response to the capacitor discharge current flowing through the protecting gap device to move one contact towards the other contact to make the contacts independent of the drivning cylinder, the discharge gap device, the electromagnetic repulsion device and the pair of contacts being aligned along an axis so that the discharge gap device assumes the uppermost position, a concentric cylindrical member made of an electrically conductive material and mounted around the aligned parts, the cylindrical member having one closed end positioned at the side of the discharge gap device and one open end positioned at the side of the driving cylinder for the bypass switch, the cylindrical member being connected in parallel with the aligned parts to provide a current path including the gap device and a magnetic repulsion winding of the electromagnetic repulsion device for discharging the capacitor current until the capacitor bypass switch closes its contacts, and an enclosure filled with an electric insulating gas and enclosing the discharge device, the electromagnetic repulsion means and the gap bypass switch therein.

2. A protecting apparatus according to claim 1 wherein the protecting gap device is mounted on an upper end of a metallic casing electrically connected with one terminal of the capacitor, one closed end of the cylindrical member is electrically connected to the gap device through a rod member which is mounted on one electrode of the gap assembly and which extends through an opening provided at the closed end of the cylindrical member so that a part adjacent to the closed end of the cylindrical member forms a current return path which cooperates with the gap assembly and the metallic casing for presenting a small inductance to the capacitor discharge current.

3. A protecting apparatus according to claim 1 wherein the gap device is assembled to form a tubular member, the electromagnetic repulsion device is assembled in a tubular metallic casing, the bypass switch is assembled by surrounding its contacts with a tubular insulator, and the gap device, the repulsion device and the bypass switch form a single tubular member and high pressure insulating gas is enclosed within the bypass switch.

4. A protecting apparatus according to claim 3 wherein the metallic casing surrounding the electromagnetic repulsion device includes a gas passage in an inner space of the bypass switch which is connected to an inner space of the gap device, and wherein the bypass switch closes its contacts to short circuit the terminals across the capacitor, one of the contacts separates from its valve seat to direct a gas flow into the gap device through the gas passage so that an air gap between the electrodes of the gap device is cleaned by the gas flow.

5. A protecting apparatus according to claim 1 wherein a metallic casing is interposed between the gap device and the capacitor bypass switch, and the casing is connected to one terminal of the capacitor through a connection rod slidably connected with a periphery of the casing, a stationary contact of the capacitor bypass switch has a rod which extends into the metallic casing and has a valve member mounted thereon to open a gas passage provided in the metallic casing in response to the capacitor bypass operation of the bypass switch, and wherein an insulating gas can flow into the gap device during the capacitor bypass operation to extinguish an electric arc in the air gap and to clean the air gap.

6. A protecting apparatus according to claim 3 wherein the electromagnetic repulsion device is provided in a metallic casing mounted below the capacitor bypass switch, the metallic casing is connected with the other terminal of the capacitor through a connection rod slidably connected thereto, and whereby a lower part of the cylindrical member, the electromagnetic repulsion device and a part of the metallic casing of the electromagnetic repulsion device form in conjunction a return path for the capacitor discharge current.

7. A protecting apparatus according to claim 1 wherein a piston rod of the fluid operational cylinder is coupled with a movable contact of the capacitor bypass switch whereby the movable contact is driven by the fluid operational cylinder to contact a stationary contact of the bypass switch when a capacitor bypass signal is applied to a control valve of the cylinder and, at the same time, the electromagnetic repulsion device is reset by the closing stroke of the switch and the movable contact is reset at its original open position when a resetting signal is applied to the control of the switch.

8. A protecting apparatus according to claim 1 wherein a piston rod of the fluid operational cylinder is coupled with a movable contact of the capacitor bypass switch through a lost motion coupler, the electromagnetic repulsion device is interposed between the lost motion coupler and the movable contact of the capacitor bypass switch, whereby the electromagnetic repulsion device causes the movable contact to contact a stationary contact of the bypass switch independently of the fluid operational cylinder and the fluid operational cylinder causes the movable contact to separate from the stationary contact when a resetting signal is applied to a control of the fluid operational cylinder.

* * * * *